United States Patent [19]
Fujiwara et al.

[11] Patent Number: 5,856,848
[45] Date of Patent: Jan. 5, 1999

[54] MOVING IMAGE CODER

[75] Inventors: Yoichi Fujiwara, Chiba; Toshiyuki Miyake, Tenri; Hiroyuki Katata, Ichihara; Tomoko Aono; Hiroshi Kusao, both of Chiba, all of Japan

[73] Assignee: Sharp Kabushiki Kaisha, Osaka, Japan

[21] Appl. No.: 882,114

[22] Filed: Jun. 25, 1997

Related U.S. Application Data

[63] Continuation of Ser. No. 357,169, Dec. 13, 1994, abandoned.

[30] Foreign Application Priority Data

Dec. 28, 1993  [JP]  Japan .................................. 5-338474

[51] Int. Cl.$^6$ ................................................. H04N 7/18
[52] U.S. Cl. ............................ 348/416; 348/415; 348/413; 348/699; 348/411
[58] Field of Search ................................. 348/411, 410, 348/412, 415, 416, 699, 700, 845.1–845.3

[56]  References Cited

U.S. PATENT DOCUMENTS

| | | | |
|---|---|---|---|
| 4,685,115 | 8/1987 | Akagiri et al. .............................. | 375/25 |
| 5,103,307 | 4/1992 | Sugiyama .................................. | 348/415 |
| 5,241,383 | 8/1993 | Chen et al. . | |
| 5,327,173 | 7/1994 | Nishizawa et al. ....................... | 348/412 |
| 5,386,234 | 1/1995 | Veltman et al. .......................... | 348/409 |
| 5,404,174 | 4/1995 | Sugahara .................................. | 348/415 |
| 5,410,553 | 4/1995 | Choon ...................................... | 348/411 |
| 5,436,665 | 7/1995 | Ueno et al. ............................... | 348/412 |
| 5,459,517 | 10/1995 | Kunitake et al. ........................ | 348/416 |
| 5,467,086 | 11/1995 | Jeong ....................................... | 348/411 |
| 5,488,482 | 1/1996 | Ueda et al. .............................. | 348/415 |
| 5,541,661 | 7/1996 | Odaka et al. ............................ | 348/416 |
| 5,570,133 | 10/1996 | Yagasaki .................................. | 348/416 |

FOREIGN PATENT DOCUMENTS

| | | |
|---|---|---|
| 0521529 | 1/1993 | European Pat. Off. . |
| 0536630 | 4/1993 | European Pat. Off. . |
| 2691272 | 11/1993 | France . |

OTHER PUBLICATIONS

Hiroshi Watanabe, "MPEG2 Interframe Prediction", Oct. 1992, pp. 37–42, ITEJ Technical Report, vol. 16, No. 61.

*Primary Examiner*—Tommy P. Chin
*Assistant Examiner*—Anand S. Rao

[57]  ABSTRACT

A moving image coder has an arithmetic unit for calculating an average value of a coding object block; an arithmetic unit for obtaining an alternating current component by subtracting the average value from each of pixel values of the coding object block; an arithmetic unit for obtaining a intra frame activity amount by making a calculation of the same kind as an error calculation in a motion prediction with respect to the obtained alternating current component; and a comparator for comparing the intra frame activity amount with a predicting error amount calculated when the motion prediction is made. The inter frame coding mode or the intra frame coding mode is judged by large and small relations of the predicting error amount and the intra frame activity amount. In this moving image coder, codings of a intra frame block and a inter frame differential block are adaptively switched in a small hardware scale.

9 Claims, 10 Drawing Sheets

MOVING IMAGE CODER

This application is a continuation of application Ser. No. 08/357,169 filed on Dec. 13, 1994, now abandoned.

BACKGROUND OF THE INVENTION

1. Field of the Invention

The present invention relates to a moving image coder for adaptively switching intra frame coding and inter frame coding.

2. Description of the Related Art

An adaptive inter frame image coding method is known when moving image information is digitally transmitted or recorded. In this coding method, intra frame coding and inter frame coding are adaptively switched and used. A differential signal between an input signal and a predicting signal is normally inputted to a coder as it is in a inter frame coding mode. However, in the case of a scene change, etc., an input signal is directly inputted to a coder as it is in a intra frame coding mode.

FIG. 8 is a block diagram of a general adaptive inter frame image coder.

A intra frame block X as a coding object block is inputted to an image input terminal 61. A difference between the intra frame block X and a predicting block P is calculated by a subtracter 62. The predicting block P is calculated by making a motion prediction from a reference image held in a predicting section 71. Thus, an inter frame differential block E is obtained by an output of the subtracter 62.

A control section 64 compares the intra frame block X and the inter frame differential block E with each other and judges whether the intra frame block X or the inter frame differential block E is coded. The control section 64 then controls the operation of a switch 63 in accordance with this judgment. In the following description, an intra frame coding mode is called when the intra frame block X is selected. An inter frame coding mode is called when the inter frame differential block E is selected.

A block D selected by the switch 63 is inputted to a coding section 65 and is coded by this coding section 65 so that code data Y are outputted from this coding section 65.

Coding mode information C relates to selection of one of the intra frame block X and the inter frame block E. The coding mode information C and a motion vector MV in the motion prediction are multiplexed to the code data Y by a multiplexer 66. A coding output Z of the multiplexer 66 at a multiplexing output terminal 67 thereof is transmitted or recorded.

A decoding operation is simultaneously performed on a coding side by using the code data Y and the coding mode information C.

The code data Y are inputted to a decoding section 68 and are decoded by this decoding section 68 so that a block D' is obtained. The block D' and the predicting block P are inputted to two input terminals of an adder 69 so that a sum of these blocks is calculated by this adder 69. A block E' as results of this additional calculation is obtained as an output of the adder 69.

Each of the blocks E' and D' is selected by a switch 70 controlled by the coding mode information C. At this time, the block D' is selected when the intra frame block X is inputted to the coding section 65 in the intra frame coding mode. The block E' is selected when the inter frame differential block E is inputted to the coding section 65 in the inter frame coding mode. The selected block is set to a decoding block X' and is inputted to the predicting section 71.

A complete decoding image is obtained when processings of one picture (one frame) are terminated. This decoding image is set to a reference image for generating a predicting block with respect to a subsequent coding object and is held in the predicting section 71.

In general, each of images located before and after a coding image in time is used as the reference image. When the motion prediction is used, a generating coding amount in the inter frame coding mode is smaller than that in the intra frame coding mode in a case in which an object is moved in parallel, etc. so that a portion corresponding to a coding image block exists within the reference image. Accordingly, it is preferable to select the inter frame coding mode in this case. In contrast to this, when an object appears from a screen end or a place behind something and scenes are changed, etc., no portion corresponding to the intra frame block exists within the reference image. In this case, the generating coding amount in the intra frame coding mode tends to be smaller than that in the inter frame coding mode. Accordingly, it is preferable to select the intra frame coding mode in this case.

The intra frame coding mode and the inter frame coding mode in the control section 64 are ideally switched in accordance with large and small coding amounts generated in codings of images if distortional degrees of these images caused by the codings are equal to each other. Namely, a smaller one of the generated coding amounts is selected in this case. In contrast to this, if the coding amounts generated by the codings are approximately equal to each other, the intra frame coding mode and the inter frame coding mode in the control section 64 are ideally switched in accordance with large and small distortions caused by the codings. Namely, a smaller one of the distortions generated by the codings is selected in this case. However, no coding amounts generated in the intra frame coding mode and the inter frame coding mode can be known in advance before the codings are performed. Further, no distortions caused by the codings can be accurately known before the codings are performed.

Therefore, for example, a mean square error of the intra frame block and the predicting block is compared with variance of the intra frame block in the literature of "A predicting system between MPEG2 frames" described in Television Society Technical Report, vol. 16, No. 61, pp. 37–42. This mean square error of the intra frame block and the predicting block and this variance of the intra frame block are respectively simply called the mean square error and the variance in the following description. If the variance <64 is formed, the between-frame coding mode is used. In contrast to this, if the variance >64 is formed, a mode providing min [the mean square error, the variance] is selected. In this case, min [x, y] means that a smaller one of x and y is used.

Here, variance of the inter frame differential block instead of the mean square error should be originally compared with the variance of the intra frame block. However, it can be supposed that an average value of pixel values in the inter frame differential block is equal to zero. Further, the variance of the inter frame differential block is obtained by subtracting the average value of pixel values in the inter frame differential block from the mean square error. Accordingly, the mean square error is used in the above literature. The average value of pixel values in the inter frame differential block can be supposed to be zero since it is known that a distribution of differential values between pixels having a high correlation with respect to an image is generally equal to a Laplace distribution having an average value of zero.

FIG. 9 is a block diagram of a calculating section for calculating the variance of the intra frame block.

Pixel value data in the intra frame block are stored to a cache memory 75 and are read from this cache memory 75 in accordance with an address generated by a controller 87. When a pixel value in the intra frame block is set to x(n), the variance of the intra frame block is represented by the following formula (1).

$$\overline{(x(n) - \overline{x(n)})^2} = \overline{x(n)^2} - \overline{x(n)}^2 \quad (1)$$

$$= \frac{1}{N} \sum_n x(n)^2 - \left[\frac{1}{N} \sum_n x(n)\right]^2$$

$$= \frac{1}{N} \sum_n x(n)^2 - \frac{1}{N^2} \left[\sum_n x(n)\right]^2$$

In this formula, n shows an address of the cache memory 75 and N shows the number of pixels within the intra frame block. "−" shows an average calculated in an average calculation within the intra frame block.

In FIG. 9, a constructional portion 76 surrounded by a dotted line calculates the following value $$\overline{x(n)^2}$$

as a mean square value of pixel values in the intra frame block.

An output of pixel value data of the cache memory 75 is inputted to two input terminals of a multiplier 77. Accordingly, a square value of the pixel value data is outputted from the multiplier 77 to one input terminal of an adder 78. An output of the adder 78 is inputted to an input terminal of a register 79. An output of the register 79 is inputted to another input terminal of the adder 78.

The adder 78 and the register 79 constitute an accumulative adding section. The output of the register 79 is also inputted to a latch 80. The latch 80 is used to hold calculated results and an operation of this latch 80 is controlled such that only results of the accumulative addition in a block unit are transmitted to a subsequent circuit portion. When these results are held, contents of the register 79 are reset on the basis of a control output of the controller 87 to calculate an accumulative adding value in the next block. When the number N of pixels is written as $N=2^a$ by power of 2, a calculation divided by this number N can be made by performing only a bit shifting operation in which a dividend is rightward shifted by a-bits. Accordingly, a divider is omitted in FIG. 9. In a case except for this case, it is necessary to arrange a divider after the latch 80. An output of the latch 80 shows a mean square value of pixel values in the intra frame block.

In FIG. 9, a constructional portion 82 surrounded by a dotted line calculates the following value $$\overline{x(n)}^2$$

as a square value of the average value of pixel values in the intra frame block.

The output of pixel value data of the cache memory 75 is inputted to one input terminal of the adder 83. An output of the adder 83 is inputted to an input terminal of a register 84. An output of the register 84 is inputted to another input terminal of the adder 83. The adder 83 and the register 84 constitute an accumulative adding section. The output of the register 84 is also inputted to a latch 85. The latch 85 is used to hold calculated results and an operation of this latch 85 is controlled such that only results of the accumulative addition in a block unit are transmitted to a subsequent circuit portion. When these results are held, contents of the register 84 are reset on the basis of a control output of the controller 87 to calculate an accumulative adding value in the next block. As mentioned above, a calculation divided by the number N of pixels can be made by performing only a bit shifting operation in which a dividend is rightward shifted by a-bits. Accordingly, a divisor device is omitted in FIG. 9. In a case except for this case, it is necessary to arrange a divider after the latch 85.

An output of the latch 85 is inputted to two input terminals of a multiplier 86. Accordingly, the multiplier 86 outputs a square value of an average value of pixel values in the intra frame block.

Finally, the output of the latch 80 is inputted to a minuend input terminal of a subtracter 81. The output of the multiplier 86 is inputted to a subtrahend input terminal of the subtracter 81. The subtracter 81 outputs a value of the variance of the intra frame block.

In the following description, a pixel value of the intra frame block is set to x(n) and a pixel value of the predicting block is set to y(n) when n is set to an address of the cache memory. In this case, a mean square error of the inter frame differential block is represented by the following formula (2).

$$\overline{(x(n) - y(n))^2} \quad (2)$$

This mean square error corresponds to a case in which x(n) is set to a pixel value of the inter frame differential block in the formula (1) for calculating the variance and the following equality condition is satisfied.

$$\overline{x(n)} = 0$$

Accordingly, x(n)−y(n) as a difference between the pixel value x(n) of the intra frame block and the pixel value y(n) of the predicting block is read from the cache memory. The read difference x(n)−y(n) is inputted to a mean square value calculating circuit composed of a multiplier, an adder, a register and a latch equal to those in the constructional portion 76 shown by a dotted line in FIG. 9 so that this mean square error can be calculated.

FIG. 10 is a block diagram of a coding mode judging section when the above mean square error is used. This coding mode judging section is arranged in the control section 64 in FIG. 8.

A mean square value calculating section 76 and a section 82 for calculating a square of an average value in FIG. 10 respectively correspond to the constructional portions 76 and 82 in FIG. 9. The mean square error and the variance respectively calculated with respect to the inter frame differential block E and the intra frame block X are inputted to a comparator 89. Coding mode information C is determined and outputted by large and small relations of the mean square error and the variance.

As can be seen from FIG. 9, a product sum calculation and a sum product calculation are required to calculate the variance. It is necessary to arrange at least two multipliers and three adders-subtracters. In particular, each of the multipliers is a factor causing a great increase in hardware scale of the moving image coder. The product sum calculation is also required to calculate the mean square error. In this case, it is necessary to arrange at least one multiplier and one adder. Accordingly, three product sum arithmetic units and three sum product arithmetic units are required to judge the inter frame coding mode and the intra frame coding mode so that a circuit scale of the moving image coder is very large.

SUMMARY OF THE INVENTION

It is therefore an object of the present invention to provide a moving image coder for adaptively switching codings of a intra frame block and a inter frame differential block in a small hardware scale.

The above object of the present invention can be achieved by a moving image coder in which an image is divided into image blocks and codings are switched by adaptively selecting a inter frame coding mode or a intra frame coding mode every image block;

the inter frame coding mode uses a motion prediction from a forward frame, a backward frame or both the forward and backward frames with respect to each of the image blocks;

no motion prediction is made in the intra frame coding mode with respect to each of the image blocks; and a motion vector used in the motion prediction is set to a vector for minimizing a predicting error amount obtained by making a predetermined error calculation with respect to a inter frame differential signal;

the moving image coder comprising:

means for calculating an average value of a coding object block;

means for obtaining an alternating current component by subtracting the average value from each of pixel values of the coding object block;

means for obtaining an intra frame activity amount by making a calculation of the same kind as the error calculation in the motion prediction with respect to the alternating current component; and means for comparing the predicting error amount and the intra frame activity amount with each other;

the inter frame coding mode or the intra frame coding mode being judged by large and small relations of the predicting error amount and the intra frame activity amount.

In the present invention, an average value of the coding object block is first calculated. Next, an alternating current component of the coding object block is calculated by subtracting the average value from each of pixel values of the coding object block. Then, an intra frame activity amount with respect to the alternating current component is obtained by making a calculation of the same kind as the predicting error calculation in the motion prediction. Finally, a predicting error amount calculated in the motion prediction is compared with the intra frame activity amount calculated from the intra frame block so that the inter frame coding mode or the intra frame coding mode is determined. The intra frame coding mode is set when predetermined functions f(x) and g(y) satisfy the following condition (3).

$$g(\text{predicting error amount}) > f(\text{intra frame activity amount}) \quad (3)$$

In contrast to this, the inter frame coding mode is set when this condition is not formed. In this condition (3), equality and inequality $\geq$ may be used instead of the inequality >.

In this moving image coder, codings of a intra frame block and a inter frame differential block are adaptively switched in a small hardware scale.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a moving image coder in the present invention will next be described in detail with reference to the accompanying drawings.

Figure 1:
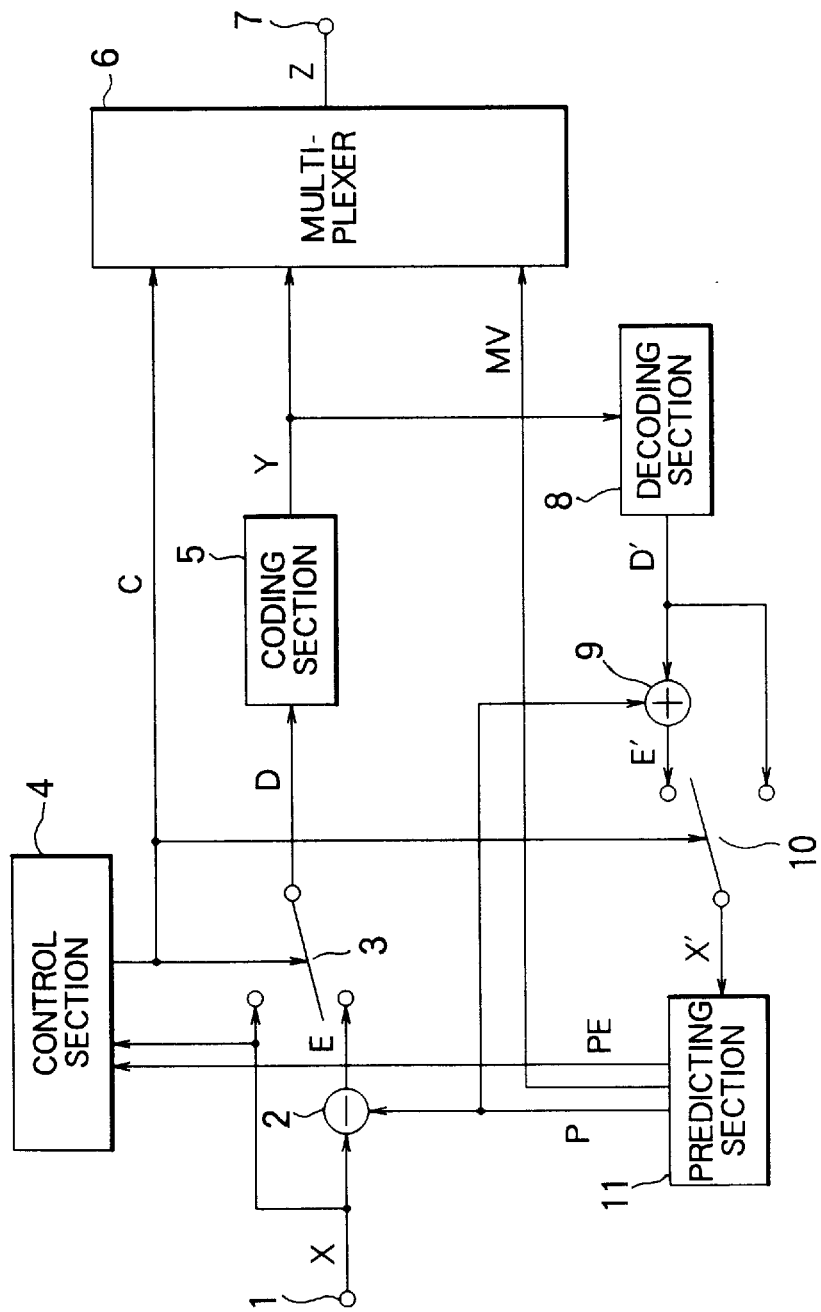
FIG. 1 is a block diagram of a moving image coder in accordance with an embodiment of the present invention.

FIG. 1 is a block diagram of a moving image coder in accordance with one embodiment of the present invention.

First, a color image is represented by a brightness signal Y and color difference signals CR and CB. An image signal is converted to an intermediate format of CIF or QCIF in an unillustrated preprocessing section and a noise removing filtering operation is also performed with respect to this image signal.

For example, a coding object block as an intra frame block X is divided into 8×8 pixels. This intra frame block X is sequentially inputted to an image input terminal 1 in a predetermined pixel order. A difference between the intra frame block X and a predicting block P is calculated by a subtracter 2. The predicting block P is calculated by making a motion prediction from a reference image held in a predicting section 11. The subtracter 2 outputs a inter frame differential block E in this predetermined pixel order.

The intra frame block X and a predicting error PE from the predicting section 11 are inputted to a control section 4. The control section 4 compares a predicting error amount based on the predicting error PE with an intra frame activity amount described later to judge whether the intra frame block X or the inter frame differential block E is coded. Namely, the control section 4 judges whether an intra frame coding mode or an inter frame coding mode is selected. The operation of a switch 3 is controlled from this judgment.

A block D selected by the switch 3 is inputted to a coding section 5 and is coded by this coding section 5. The coding section 5 outputs code data Y. In one example, the coding section 5 makes the calculation of a discrete cosine transformation (DCT) with respect to this inputted block. Next, a DCT coefficient is quantized. Entropy coding may be next performed.

Coding mode information C relates to selection of one of the intra frame block X and the inter frame block E. The coding mode information C and a motion vector MV in the motion prediction are multiplexed to the code data Y by a multiplexer 6. A coding output Z of the multiplexer 6 at a multiplexing output terminal 7 thereof is transmitted onto an input side of another circuit or is recorded to a memory medium.

A decoding operation is simultaneously performed on a coding side by using the code data Y and the coding mode information C.

The code data Y are inputted to a decoding section 8 and are decoded by this decoding section 8 so that a block D' is obtained. Further, the block D' and the predicting block P are inputted to two input terminals of an adder 9 so that a sum of these blocks is calculated by this adder 9. A block E' as results of this additional calculation is obtained as an output of the adder 9.

Each of the blocks E' and D' is selected by a switch 10 controlled by the coding mode information C. At this time, the block D' is selected when the intra frame block X is inputted to the coding section 5 in the intra frame coding mode. The block E' is selected when the inter frame differential block E is inputted to the coding section 5 in the inter frame coding mode. When the selected block is set to a decoding block X', this block X' is inputted to the predicting section 11.

A complete decoding image is obtained when processings of one picture (one frame) are terminated. This decoding image is set to a reference image for generating a predicting block with respect to a subsequent coding object and is held in the predicting section 11.

Figure 11:
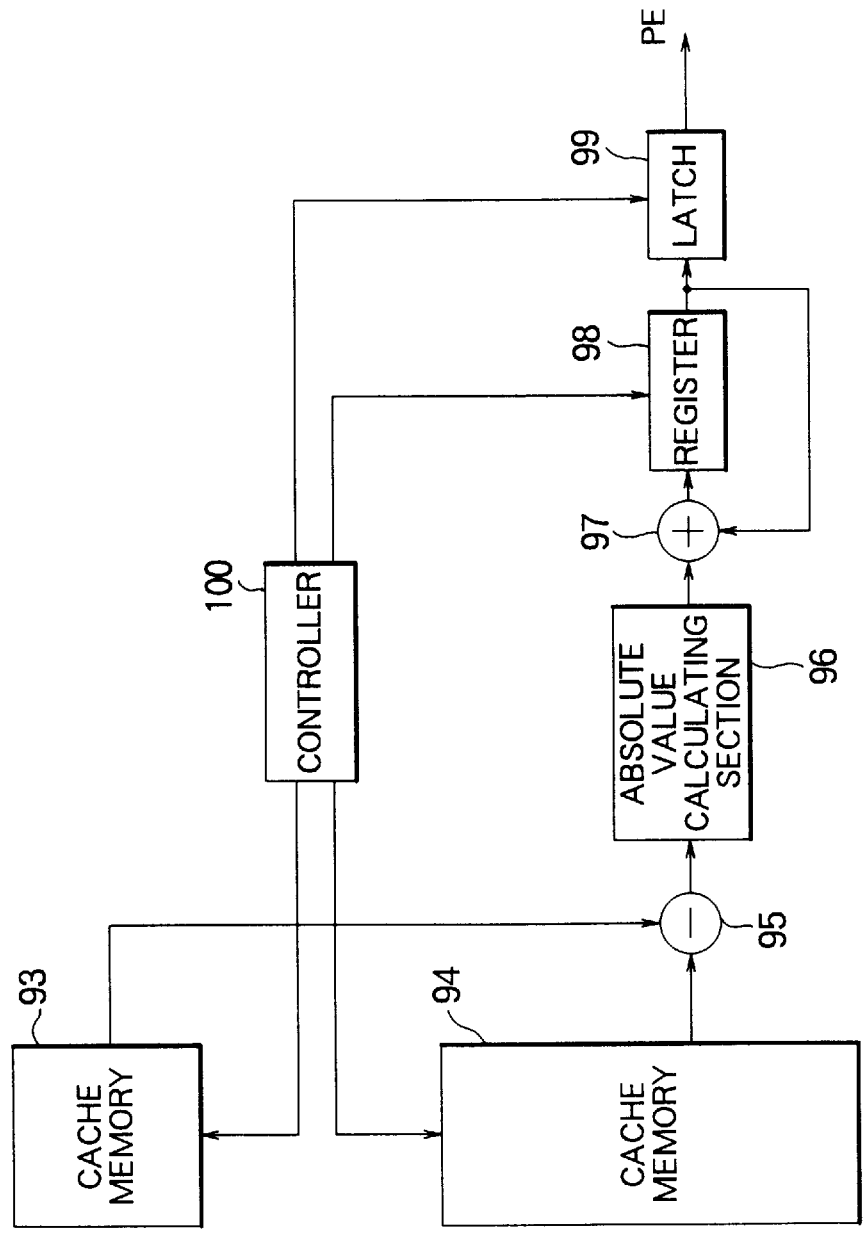
FIG. 11 is a block diagram showing a predicting error generating section.

FIG. 11 illustrates the detailed construction of a predicting error generating section within the predicting section 11 shown as a constructional block in FIG. 1.

In FIG. 11, a coding image block and a reference image are stored to cache memories 93 and 94. The coding image block is read from the cache memory 93 by control of a controller 100 so that the coding image block is inputted to a minuend input terminal of a subtracter 95. A predicting image block calculated from the reference image is read from the cache memory 94 by control of the controller 100 so that the predicting image block is inputted to a subtrahend input terminal of the subtracter 95. An output of the subtracter 95 is inputted to an absolute value calculating section 96. An output of the absolute value calculating section 96 is inputted to one input terminal of an adder 97. An output of the adder 97 is inputted to an input terminal of a register 98. An output of the register 98 is inputted to another input terminal of the adder 97. The adder 97 and the register 98 constitute an accumulative adding section. The output of the register 98 is also inputted to a latch 99. The latch 99 is used to hold calculated results and an operation of this latch 99 is controlled such that only results of the accumulative addition in a block unit are transmitted to a subsequent circuit portion. When these results are held, contents of the register 98 are reset on the basis of a control output of the controller 100 to calculate an accumulative adding value in the next block. The latch 99 outputs a predicting error PE.

Figure 8:
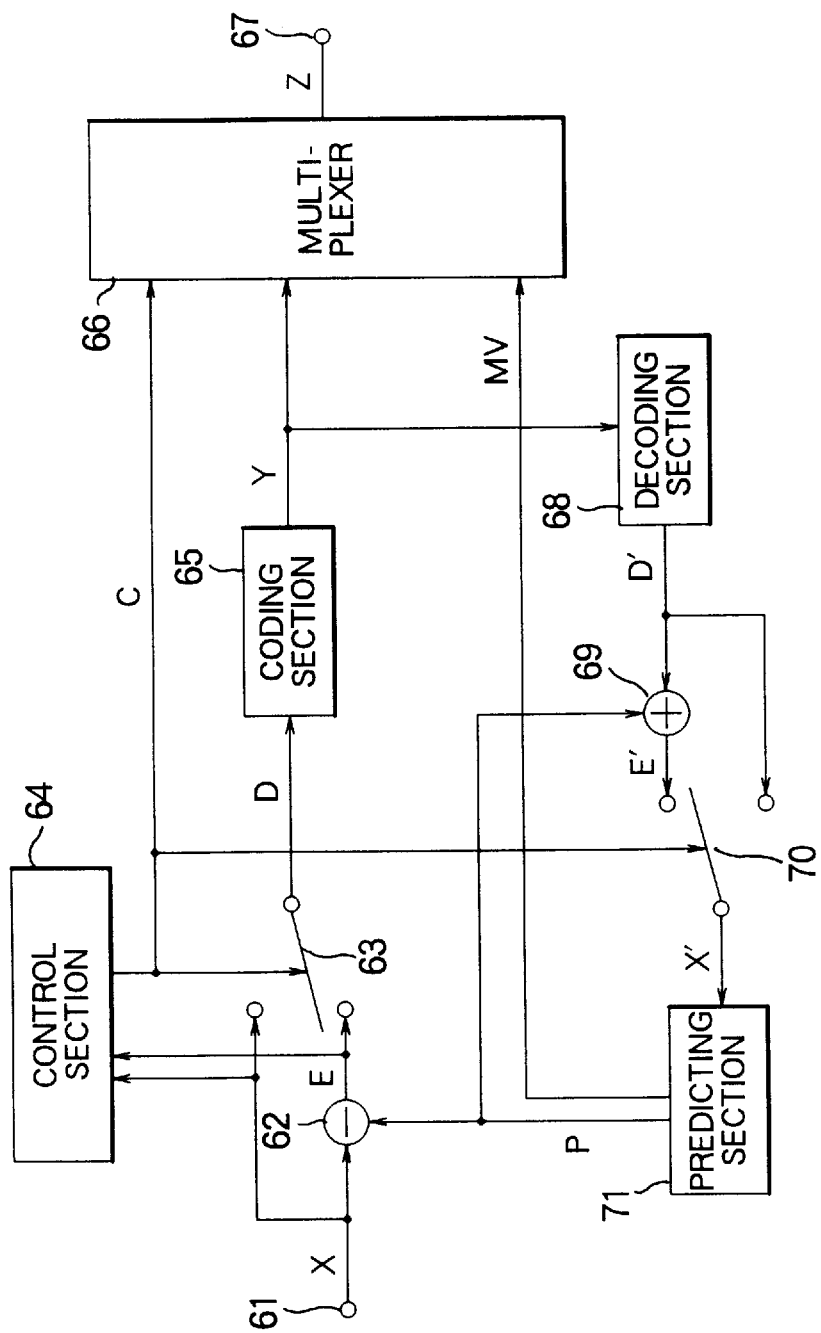
FIG. 8 is a block diagram showing a general adaptive inter frame image coder.
Figure 9:
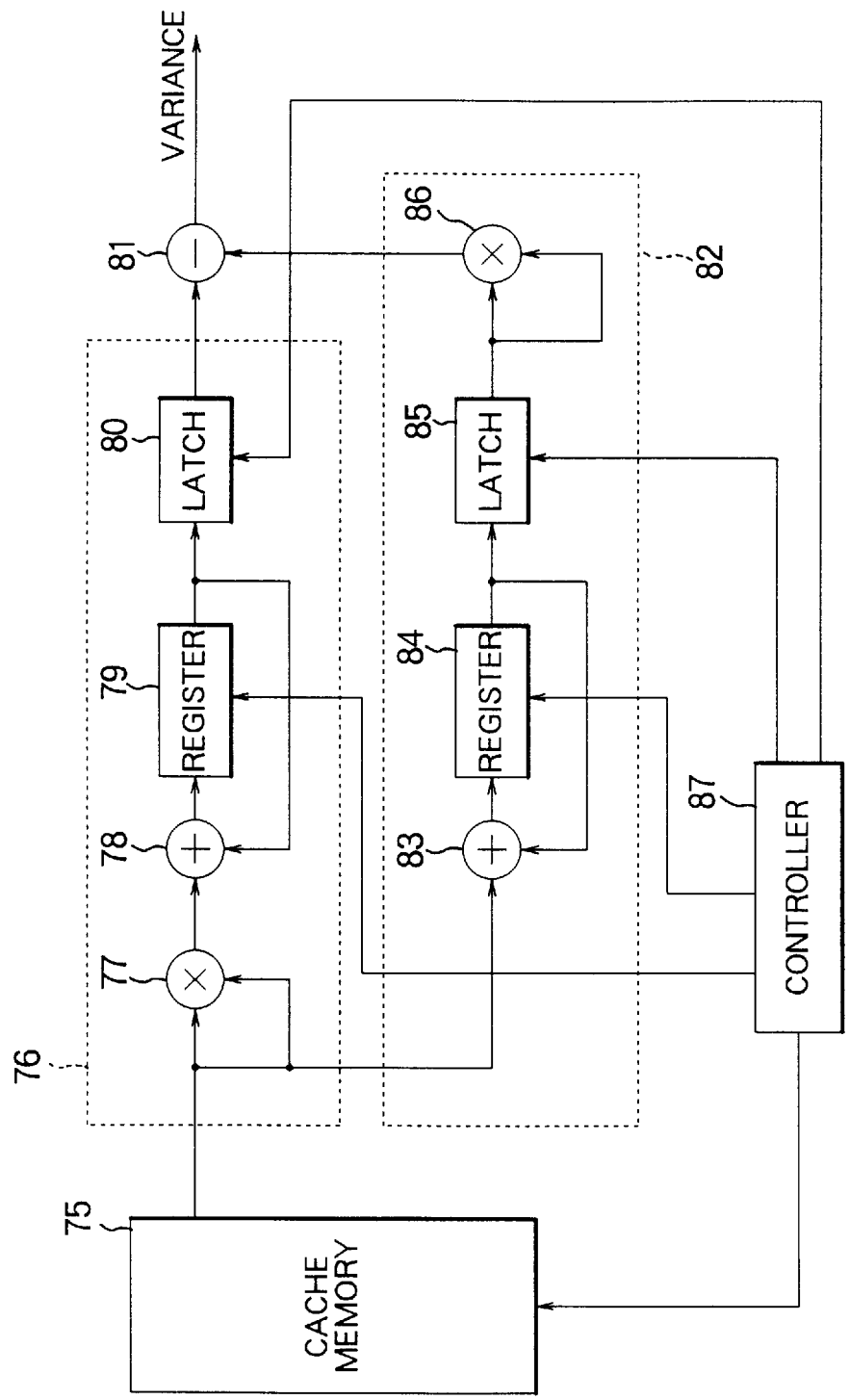
FIG. 9 is a block diagram showing a section for calculating variance of an intra frame block in FIG. 8.
Figure 10:
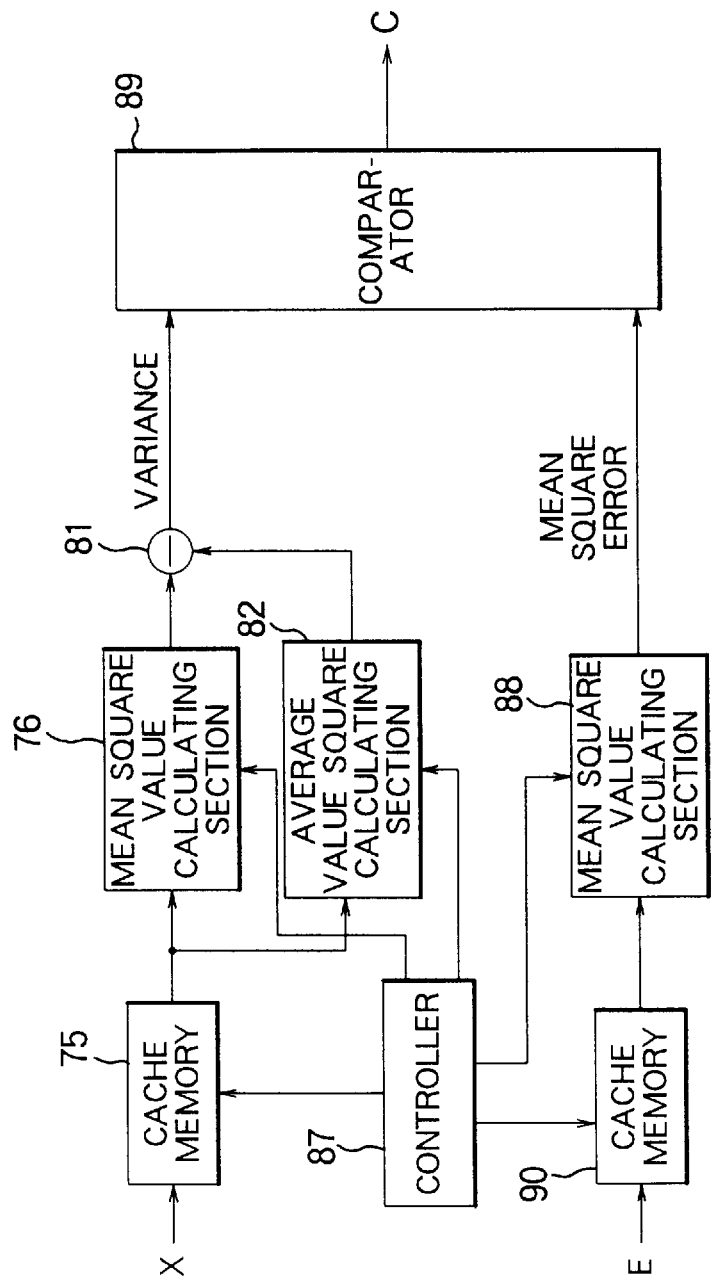
FIG. 10 is a block diagram showing a coding mode judging section in the general adaptive inter frame image coder shown in FIG. 8.

The differences between the general moving image coder shown in FIG. 8 and the moving image coder of the present invention shown in FIG. 1 are inputs with respect to the control sections 4 and 64. In the general moving image coder shown in FIG. 8, the intra frame coding block X and the inter frame differential block E are inputted to the control section 64. In contrast to this, in the moving image coder of the present invention shown in FIG. 1, the intra frame coding block X and the predicting error PE from the predicting section 11 are inputted to the control section 4.

In the general moving image coder shown in FIG. 8, the control section 64 calculates the mean square error and the variance used in judgment of the coding modes. In contrast to this, in the moving image coder of the present invention, the predicting error amount and the intra frame activity amount are used in the mode judgment. In the embodiment of the present invention, the predicting error PE calculated in the predicting section 11 is used as the predicting error amount as it is. Accordingly, in the moving image coder of the present invention, only the intra frame activity amount is calculated in the control section 4 so that the circuit scale of a mode judging section arranged within the control section 4 can be greatly reduced.

Figure 2:
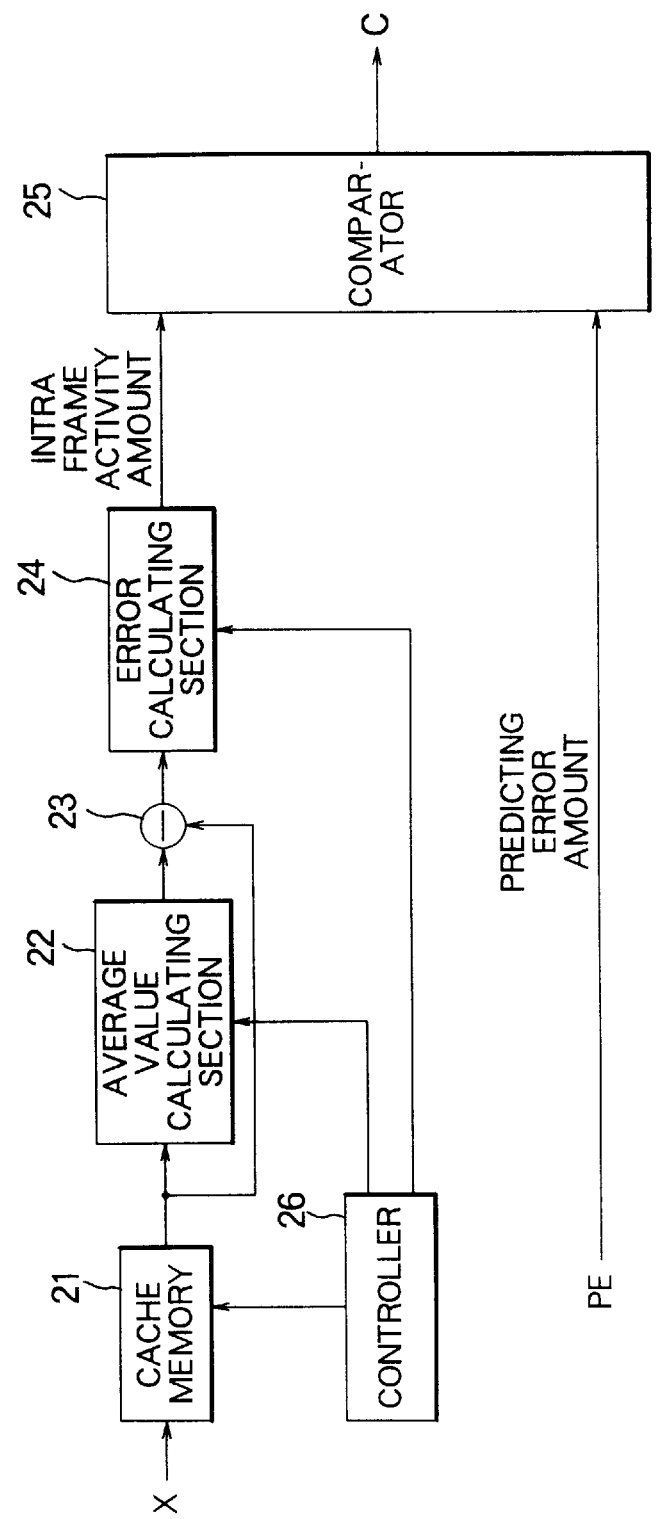
FIG. 2 is a block diagram showing one example of a mode judging section.

FIG. 2 is a block diagram showing one example of the mode judging section used in the moving image coder in the embodiment of the present invention.

A pixel value of the intra frame coding block X is once stored to a cache memory 21 and is read from this cache memory 21 in accordance with an address generated from a controller 26.

An average value calculating section 22 calculates an average value of the read pixel value data every one intra frame coding block by control of the controller 26.

An output of the average value calculating section 22 is inputted to a subtrahend input terminal of an subtracter 23. The intra frame coding block used in the calculation of the average value is again sequentially read and inputted to a minuend input terminal of the subtracter 23 in a predetermined order. In the subtracter 23, the average value calculated by the average value calculating section 22 is subtracted from the pixel value of the intra frame coding block so that an alternating current component of the intra frame coding block is obtained. Namely, each of the pixel value data is read to calculate the average value and is again read to extract the alternating current component. Therefore, the pixel value data of a specified intra frame coding block within the cache memory 21 are accessed twice.

The above alternating current component of the intra frame coding block as an output of the subtracter 23 is provided as a differential signal between the pixel value of the intra frame coding block and the average value. This differential signal is then inputted to an error calculating section 24.

The error calculating section 24 applies an error calculation used for the calculation of a motion predicting error to the alternating current component of the intra frame coding block. Namely, a sum of absolute values of alternating current components of the intra frame coding block is calculated as one example so that an intra frame activity amount is obtained.

The predicting error amount as the predicting error PE from the predicting section 11 and the intra frame activity amount calculated within the mode judging section are inputted to a comparator 25 in the mode judging section. In the comparator 25, coding mode information C is determined from large and small relations of the predicting error amount and the intra frame activity amount.

Figure 3:
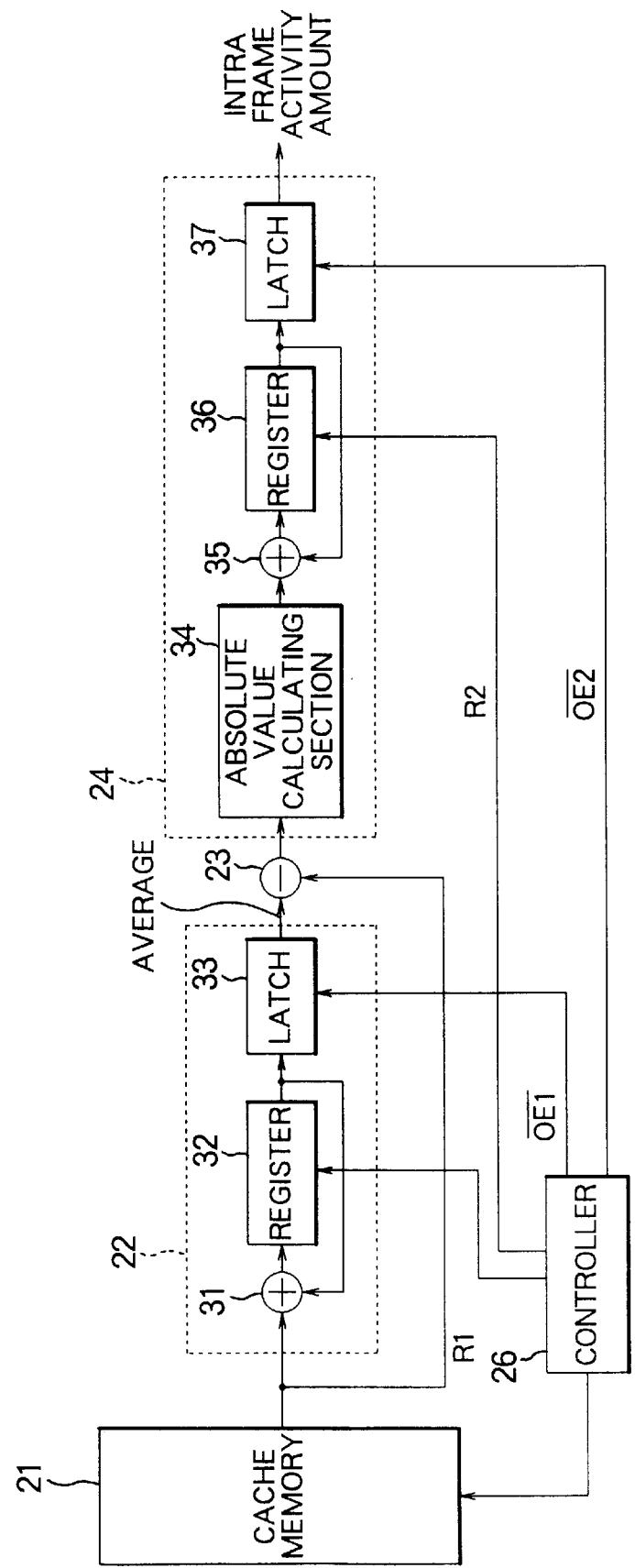
FIG. 3 is a block diagram showing a section for calculating an absolute value sum of a difference as a differential signal between a pixel value of a coding block and an average value.

One example of the average value calculating section 22 and the error calculating section 24 in FIG. 2 is shown in detail in FIG. 3.

In FIG. 3, constructional portions 21 to 24 and 26 respectively correspond to the constructional portions 21 to 24 and 26 in FIG. 2. A differential signal as a difference between a pixel value and an average value corresponds to an alternating current component. A sum of absolute values of differences as differential signals is represented as an absolute value sum by the following formula (4) when a block element is set to x(n).

$$\sum_n |x(n) - \overline{x(n)}| \quad (4)$$

In this formula (4), n is set to an address of the cache memory 21 to which pixel value data of the intra frame block are stored.

In FIG. 3, the pixel value data of the intra frame block are stored to the cache memory 21 and are read from this cache memory 21 in accordance with an address generated by the controller 26. The read pixel value data are inputted to one input terminal of an adder 31. An output of the adder 31 is inputted to an input terminal of a register 32. An output of the register 32 is inputted to another input terminal of the adder 31. The adder 31 and the register 32 constitute an accumulative adding section and calculate the following average value of the pixel value data of the intra frame coding block.

$$\overline{x(n)}$$

Calculated results are held in a latch 33 in a block unit. When the calculated results are held in the latch 33, contents of the register 32 are reset by a control signal of the controller 26 to calculate an accumulative adding value in the next block. When the number N of pixels is written as N=$2^a$ by power of 2, a calculation divided by N and required for the calculation of the average value can be made by performing only a bit shifting operation in which a dividend is rightward shifted by a-bits. Accordingly, a divisor device is omitted in FIG. 3. In a case except for this case, it is necessary to arrange a divider after the latch 33.

An alternating current component of the intra frame coding block as an output of a subtracter 23 is inputted to an input terminal of an absolute value calculating section 34. The absolute value calculating section 34 calculates an absolute value of this inputted alternating current component as a data value and outputs this calculated absolute value. Namely, in this case, the absolute value calculating section 34 calculates the following value.

$$|x(n) - \overline{x(n)}|$$

The output of the absolute value calculating section 34 is inputted to one input terminal of an adder 35. An output of the adder 35 is inputted to an input terminal of a register 36. An output of the register 36 is inputted to another input terminal of the adder 35. The adder 35 and the register 36 constitute an accumulative adding section.

The output of the register 36 is also inputted to a latch 37. An operation of the latch 37 is controlled by an output of the controller 26 so as to hold only results of the accumulative addition in a block unit. When these results are held, contents of the register 36 are reset to calculate an accumulative adding value in the next block. When a negative number is represented by a complement of 2, a sign inversion can be represented by a bit inversion and an increment and this increment can be included in the adder 35. Accordingly, no increase in hardware caused by calculating the absolute value is almost caused.

As can be seen from FIG. 3, only two adders and one subtracter are required in this calculation so that no multiplier is required. Accordingly, no multiplier is required in a mode judging section used in the moving image coder in the embodiment of the present invention shown in FIG. 2 so that a circuit scale of the moving image coder can be greatly reduced.

Figure 4:
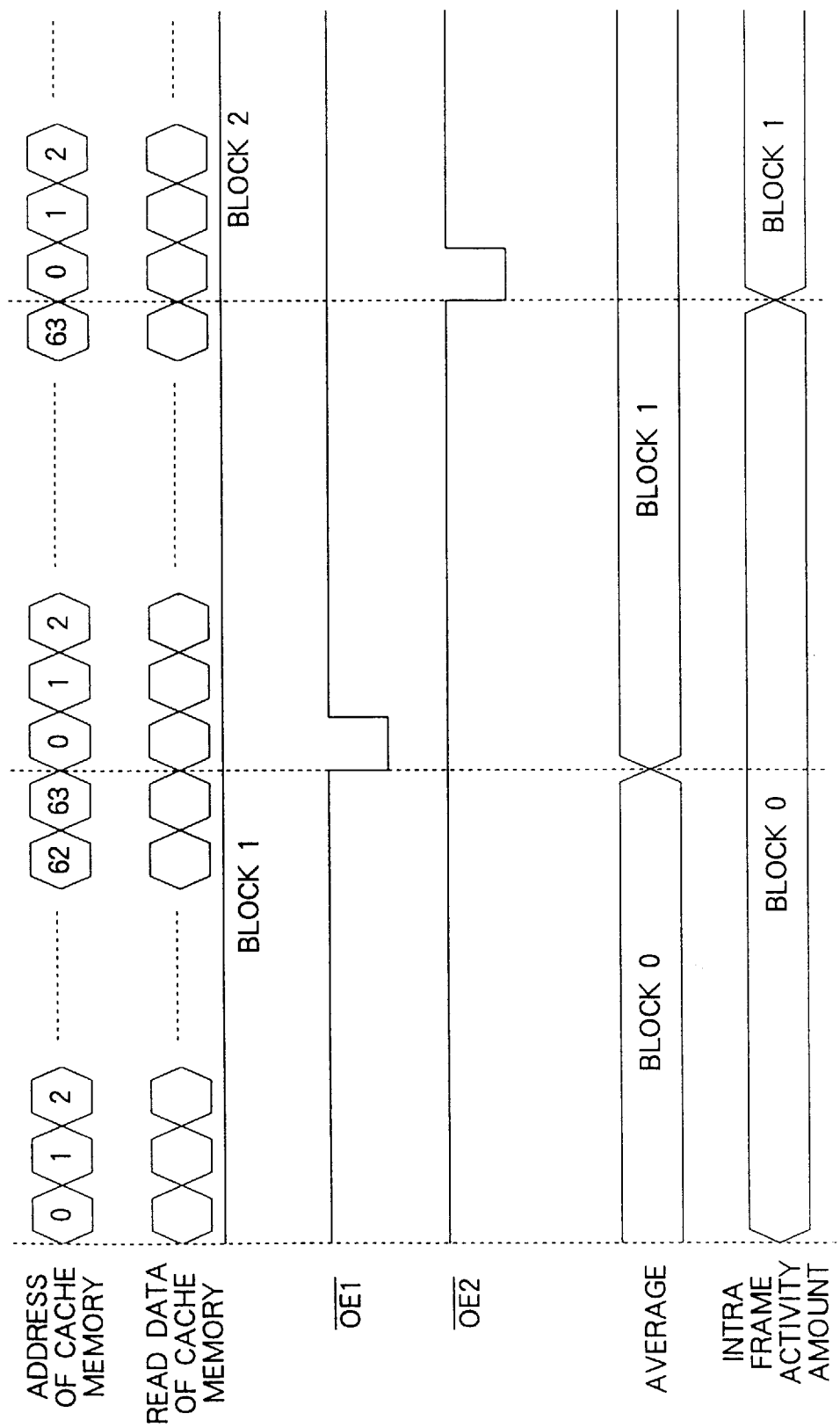
FIG. 4 is a view showing an embodiment of a control signal with respect to a cache memory and two latches.

FIG. 4 shows one embodiment of a control signal with respect to the cache memory 21 and the two latches 33 and 37 shown in the block diagram of FIG. 3. In this embodiment, a block size is set to 8×8 pixels. As mentioned above, the pixel value data within the cache memory 21 are accessed twice every one block.

The following signals $$\overline{OE1}, \overline{OE2}$$

respectively show data-inputting control signals of the latches 33 and 37. When a voltage of each of these signals is changed from a low voltage indicative of a value 0 to a high voltage indicative of a value 1, data inputted to each of the latches 33 and 37 are held in an output portion of each of the latches 33 and 37. Namely, the signal $\overline{OE1}$ is a signal for holding the following equality condition.

$$\text{Average} = \overline{x(n)}$$

Further, the signal $\overline{OE2}$ is a signal for holding the following equality condition.

$$\text{Frame interior activity amount} = \sum_n |x(n) - \overline{x(n)}|$$

In this embodiment, the increasing amount of an address value sequentially generated from the control section is set to one. Further, all pixel value data of a coding block are used to make the above calculations. However, the pixel value data used to make these calculations may be thinned out by an arbitrary thinning method to reduce a calculating time.

Figure 5:
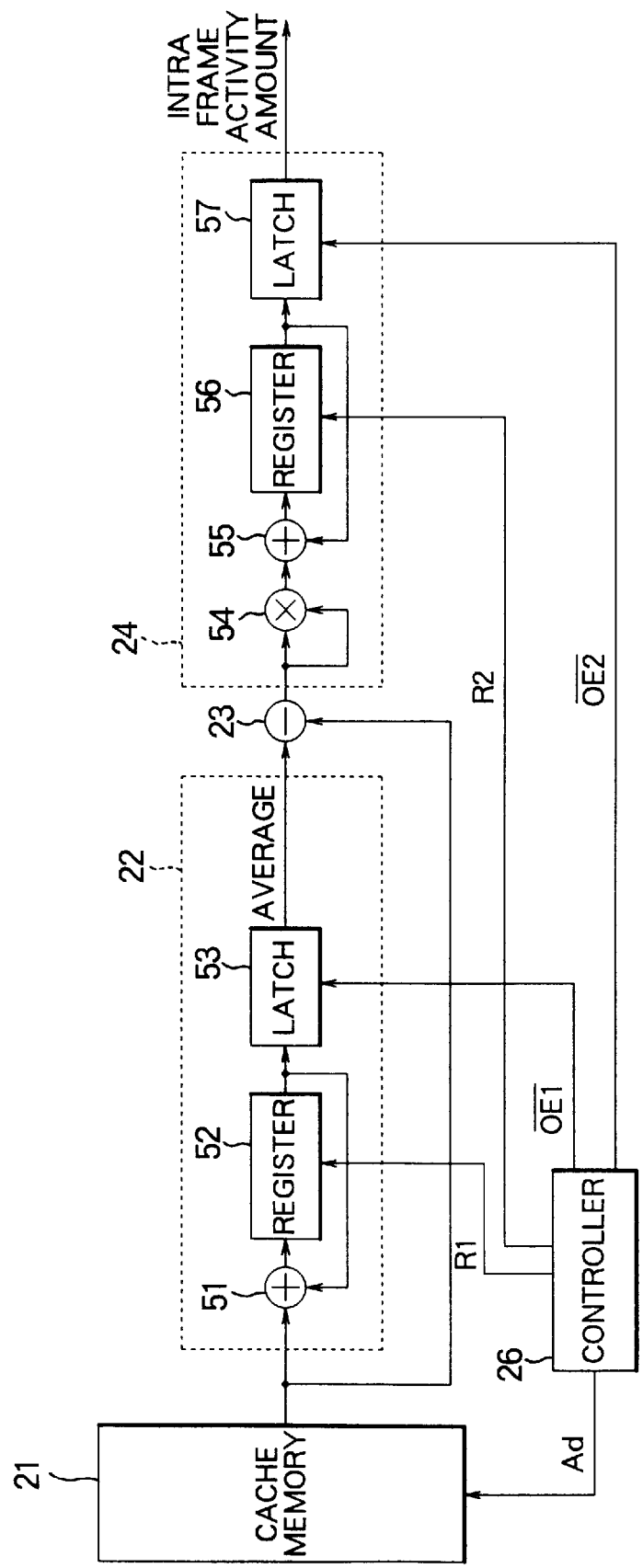
FIG. 5 is a block diagram showing one example of a section for calculating a square sum of a difference as a differential signal between a pixel value of the coding block and an average value.

Another example of the average value calculating section 22 and the error calculating section 24 in FIG. 2 is shown in detail in FIG. 5.

In FIG. 5, constructional portions 21 to 24 and 26 respectively correspond to the constructional portions 21 to 24 and 26 shown in FIG. 2.

In FIG. 5, pixel value data of a intra frame coding block are stored to a cache memory 21 and are read from this cache memory 21 in accordance with an address generated by a controller 26. The read pixel value data are inputted to one input terminal of an adder 51. An output of the adder 51 is inputted to an input terminal of a register 52. An output of the register 52 is inputted to another input terminal of the adder 51. The adder 51 and the register 52 constitute an accumulative adding section and calculate an average value of the pixel value data of the intra frame coding block. Calculated results of this average value are held in a latch 53 in a block unit. When the calculated results are held in the latch 53, contents of the register 52 are reset by a control signal of the controller 26 to calculate an accumulative adding value in the next block. When the number N of pixels is written as N=$2^a$ by power of 2, a calculation divided by N and required for the calculation of the average value can be made by performing only a bit shifting operation in which a dividend is rightward shifted by a-bits. Accordingly, a divisor device is omitted in FIG. 5. In a case except for this case, it is necessary to arrange a divider after the latch 53.

An alternating current component of the intra frame coding block as an output of a subtracter 23 is next inputted to two input terminals of a multiplier 54.

An output of the multiplier 54 is inputted to one input terminal of an adder 55. An output of the adder 55 is inputted to an input terminal of a register 56. An output of the register 56 is inputted to another input terminal of the adder 55. The adder 55 and the register 56 constitute an accumulative adding section.

The output of the register 56 is also inputted to an input terminal of a latch 57. An operation of the latch 57 is controlled by an output of the controller 26 so as to hold only results of the accumulative addition in a block unit. When these results are held, contents of the register 56 are reset to calculate an accumulative adding value in the next block.

In the embodiment shown in FIG. 5, a square sum of a difference as a differential signal between a pixel value of the intra frame coding block and an average value is calculated and set to an intra frame activity amount. The constructional portions shown in FIG. 5 are almost equal to those shown in FIG. 3. The differences between FIGS. 5 and 3 are only the multiplier 54.

Figure 6:
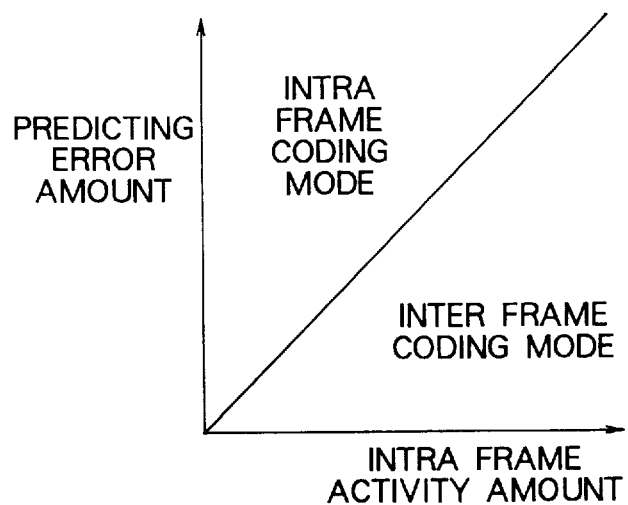
FIG. 6 is a view showing one example of mode judgment.

FIG. 6 shows one example of comparing characteristics of the comparator 25 shown in FIG. 2.

In the following description, the intra frame activity amount is set to x and the predicting error is set to y. A function of the intra frame activity amount x is set to f(x). A function of the predicting error y is set to f(y). FIG. 6 shows a case in which the characteristics of the comparator 25 shown in FIG. 2 are simplest. In this case, the following condition (5) is set.

$$\begin{cases} f(x) = x \\ g(y) = y \end{cases} \quad (5)$$

When the calculated intra frame activity amount and the predicting error amount are plotted in FIG. 6, a coding mode can be judged according to whether a plotted point belongs to any one of mode regions in FIG. 6. When the plotted point is located on a straight line, the intra frame coding mode or the inter frame coding mode is selected in accordance with the inequality > used in the above formula (3), or inequality and equality ≧ used instead of the inequality > in this formula (3). In the case shown in FIG. 6, the coding modes are judged by simply comparing the predicting error amount and the intra frame activity amount with each other. Namely, the coding modes are judged according to whether the predicting error amount is smaller or larger than the intra frame activity amount.

Figure 7:
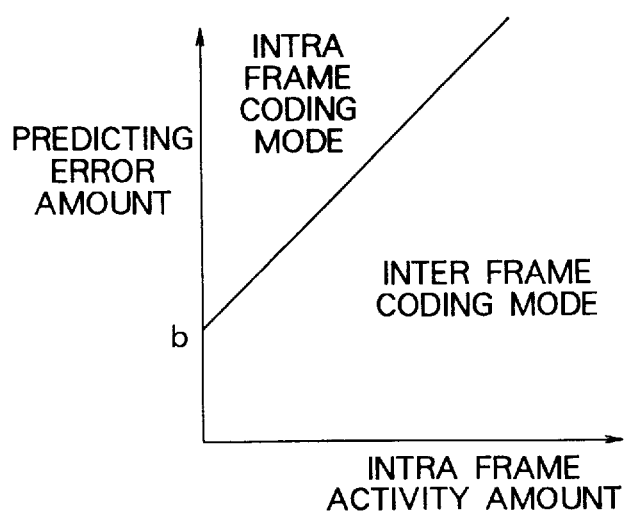
FIG. 7 is a view showing another example of the mode judgment.

FIG. 7 shows another example of the comparing characteristics of the comparator 25 shown in FIG. 2. In this example, the following condition (6) is set in the above formula (3).

$$\begin{cases} f(x) = x \\ g(y) = y + b \end{cases} \quad (6)$$

In this condition (6), b is set to a constant. In this case, it is judged by comparing these functions with each other that the inter frame coding mode is superior to the frame interior coding mode.

In a case except for this case, any function may be used as each of f(x) and g(y).

As mentioned above, the predicting error amount already calculated in a motion prediction is used to judge the inter frame coding mode and the intra frame coding mode. Accordingly, it is possible to omit a product sum calculation and a sum product calculation required in the general moving image coder. As a result, the hardware scale of a mode judging section can be greatly reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A moving image coder in which an image is divided into image blocks and a coding mode is selected from among an inter frame coding mode and an intra frame coding mode, the inter frame coding mode using an inter frame difference block as a coding object, and the intra frame coding mode using said coding image block as said coding object, said moving image coder comprising:

motion prediction means for obtaining a prediction block by setting a motion vector to be minimized and calculating a predicting error amount obtained by a predetermined error calculation with respect to each of inter frame difference signals between a candidate block of said prediction block and a corresponding coding image block;

means for calculating an average value of said coding image block;

means for obtaining alternating current components by subtracting said average value from each pixel value in said coding image block;

means for obtaining an intra frame activity amount obtained by said predetermined error calculation used in said motion prediction means with respect to each of said alternating current components;

comparing means for comparing said predicting error amount calculated by said motion prediction means with said intra frame activity amount;

determining means for determining said coding mode in accordance with the result of said comparing means; and coding means for coding said coding image block using the determined coding mode, wherein said coding image block is capable of a different coding mode than an adjacent coding image block of the image, and said determining means determines said coding mode for every coding image block.

2. A moving image coder as claimed in claim 1, wherein the intra frame coding mode is set in a case in which the value of a predetermined function substituting said predicting error amount thereinto is larger than a value of said predetermined function substituting said intra frame activity amount thereinto; and the inter frame coding mode is set in a case except for this case.

3. A moving image coder as claimed in claim 1, wherein an absolute value sum of the difference signals is used in said error calculation.

4. A moving image coder as claimed in claim 1, wherein a square sum of the difference signals is used in said error calculation.

5. A moving image coder as claimed in claim 1, wherein a predetermined function of the predicting error amount is equal to the predicting error amount, and a predetermined function of the intra frame activity amount is equal to the intra frame activity amount, and the comparing means compares these predetermined functions with each other.

6. A moving image coder as claimed in claim 1, wherein a predetermined function of the predicting error amount is equal to a sum of the predicting error amount and a constant, and a predetermined function of the intra frame activity amount is equal to the intra frame activity amount, and the comparing means compares these predetermined functions with each other.

7. A moving image coder as claimed in claim 6, wherein it is judged by comparing said functions with each other that the inter frame coding mode is superior to the intra frame coding mode.

8. The moving image coder as claimed in claim 1, wherein the coder image blocks are substantially the same size.

9. A moving image coder in which an image is divided into image blocks and a coding mode is selected from among an inter frame coding mode and an intra frame coding mode, the inter frame coding mode using an inter frame difference block as a coding object, and the intra frame coding mode using said coding image block as said coding object, said moving image coder comprising:

motion prediction means for obtaining a prediction block by setting a motion vector to be minimized and calculating a predicting error amount obtained by a predetermined error calculation with respect to each of inter frame difference signals between a candidate block of said prediction block and a corresponding coding image block;

means for calculating an average value of said coding image block;

means for obtaining alternating current components by subtracting said average value from each pixel value in said coding image block;

means for obtaining an intra frame activity amount obtained by said predetermined error calculation used in said motion prediction means with respect to each of said alternating current components;

comparing means for comparing said predicting error amount calculated by said motion prediction means with said intra frame activity amount;

determining means for determining said coding mode in accordance with the result of said comparing means; and coding means for coding said coding image block using the determined coding mode, wherein said coding image block is coded using one of the coding modes independent of the coding mode of an adjacent coding image block of the image, and said determining means determines said coding mode for every coding image block.

\* \* \* \* \*